United States Patent [19]

Anderson

[11] Patent Number: 4,617,446
[45] Date of Patent: Oct. 14, 1986

[54] WELDING FIXTURE FOR ROTARY CONE ROCK BITS WITH BELLEVILLE SEALS

[75] Inventor: George F. Anderson, Garden Grove, Calif.

[73] Assignee: Smith International, Inc., Newport Beach, Calif.

[21] Appl. No.: 659,113

[22] Filed: Oct. 9, 1984

[51] Int. Cl.$^4$ .................. B23K 15/00; B23K 26/00
[52] U.S. Cl. .................. 219/121 LC; 219/121 LY; 219/121 EC; 219/158; 228/44.3; 175/375
[58] Field of Search .................. 219/121 LC, 121 LD, 219/121 LY, 121 EC, 121 ED, 121 EL, 121 E, 158, 159; 277/92; 228/44.1; 175/375

[56] References Cited

U.S. PATENT DOCUMENTS

| | | | |
|---|---|---|---|
| 3,680,873 | 8/1972 | Garner | 277/9 |
| 3,958,739 | 5/1976 | Wicker et al. | 219/121 E X |
| 4,098,448 | 7/1978 | Sciaky et al. | 219/121 ED |

Primary Examiner—M. H. Paschall
Attorney, Agent, or Firm—Robert G. Upton

[57] ABSTRACT

A welding fixture for metallurgically bonding a belleville seal to a journal bearing of a rotary cone rock bit segment is disclosed. The fixture includes a rotary table and structure to rotatively secure the journal bearing of the rock bit segment during a welding process wherein a metallurgical bond takes place through part or all of the 360° joint between the seal and the journal bearing.

6 Claims, 4 Drawing Figures

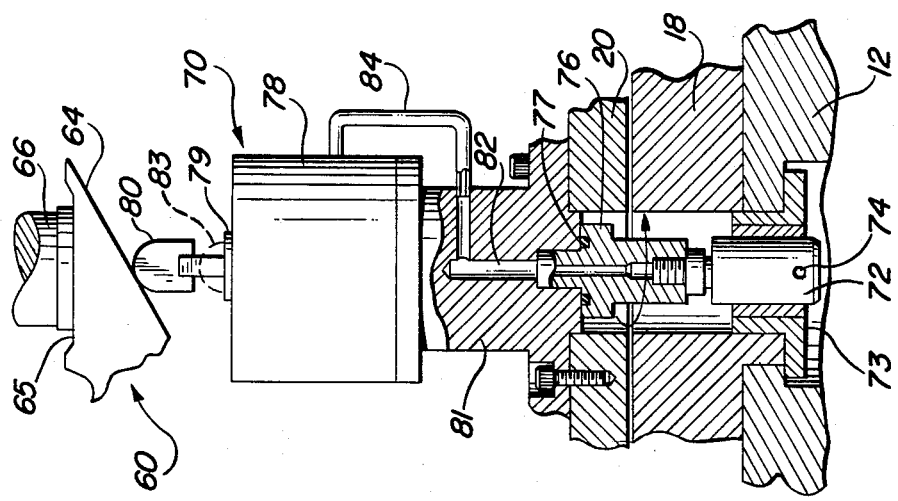
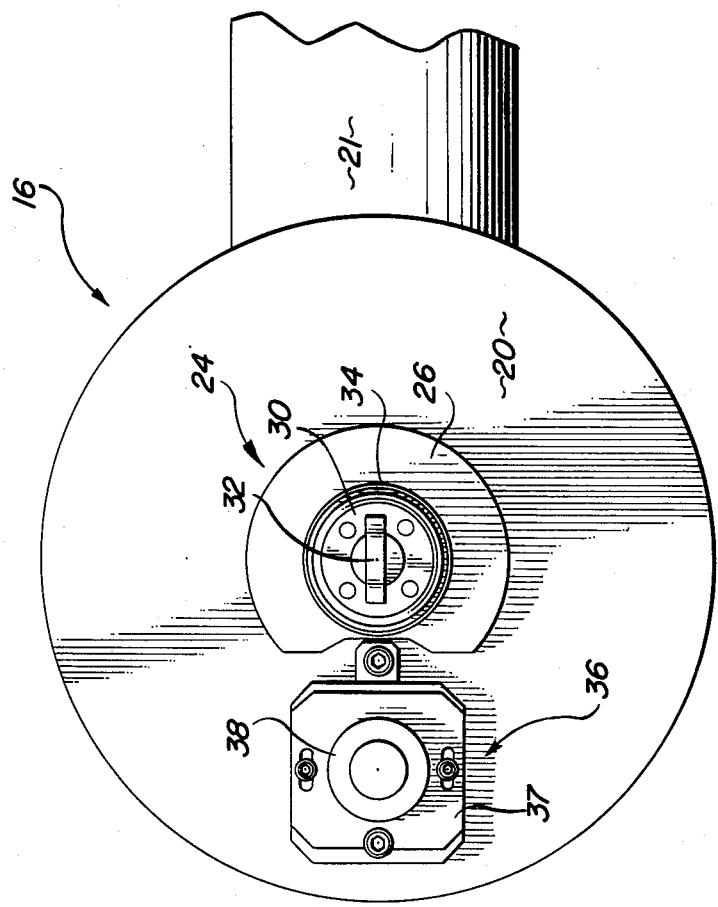

WELDING FIXTURE FOR ROTARY CONE ROCK BITS WITH BELLEVILLE SEALS

CROSS-REFERENCE TO RELATED APPLICATION

This application relates to a patent application filed July 5, 1984, Ser. No. 628,068 now U.S. Pat. No. 4,560,175 entitled HERMETICALLY WELDED BELLEVILLE SEAL FOR ROCK BITS.

BACKGROUND OF THE INVENTION

1. Field of the Invention

This invention relates to a means to weld the static side of a belleville seal to a leg of a three cone rock bit.

More particularly, this invention provides a means to hold one leg of a three cone rock bit in a rotary type fixture to weld the static portion of a belleville seal to an intersection formed between the journal bearing extending from the leg and the leg backface. The welding fixture rotates through 360° while, for example, a fixed laser welder directs a narrow beam at the intersection.

2. Description of the Prior Art

U.S. Pat. No. 3,680,873, assigned to the same assignee as the present invention, describes a belleville seal that includes an inner annular ring, preferably metallic, and an outer annular element of yieldable seal material. The inner resilient ring has a weakened breakpoint which will remain unbroken during the bonding of the annular yieldable rubberlike material to the ring. The ring is separable at the breakpoint when forced over an abutment on one of the relatively rotatable parts. The ring and yieldable material are returned or "spring back" to approximately their original diameters after passing the ridged abutment. The patent addresses the problem of securing the inner diameter static portion of the belleville seal against a rock bit leg backface to prevent the static portion or inner annular portion of the belleville seal from rotating. The present practice is to spot weld the inner metallic ring of the belleville seal to secure the broken ends of the ring and to prevent rotation of the ring during operation of the rock bit.

The recently filed patent application, Ser. No. 628,068, describes an advance in the state of the art in that the entire ring is welded through 360° at the interface between the journal and the leg backface, thus obviating any chance of a leak through this juncture between the belleville spring and the journal.

The related application is incorporated by reference and teaches a means to hermetically seal a belleville seal to a journal of a rock bit. Heretofore, no one has hermetically sealed the static side of a belleville seal after it has been placed at an intersection between the journal and the leg backface immediately adjacent the seal.

The present invention teaches the means in which the 360° weld operation is performed by preferably a continuouswave laser welding process. More particularly, it describes the means in which each leg is rigidly mounted to the welding fixture so that an accurate 360° weld operation may proceed, thus assuring continuity and good quality control during the operation. Other types of welders may be used in cooperation with the welding fixture, such as an electron beam or a pulsed laser welding process, to accomplish the circumferential weld.

SUMMARY OF THE INVENTION

It is an object of this invention to provide a means to perform a 360° welding operation on a metallic static portion of a belleville seal to a journal of a leg of a rotary cone rock bit.

More specifically, it is an object of this invention to provide a welding fixture to circumferentially beam weld an inner annular metallic ring of a belleville seal to the base of a journal bearing to effect a positive hermetic seal therebetween. The welding fixture repeatedly and reliably performs this function, thereby assuring a leak-proof joint through precise direction of the welding beam to the circumferential joint formed between the belleville seal and the journal bearing.

A welding fixture to weld a metal static portion of a belleville seal to a journal bearing is disclosed. The journal bearing extends from a leg of a sealed bearing rotary cone rock bit. The welding fixture consists of a frame. The frame has a base portion and a parallel spaced-apart top portion. The top portion is supported by support means interposed between the base portion and the top portion.

A rotary table is connected to the base portion. The rotary table has means to support the leg of the rock bit. A variable speed electric motor is connected to the rotary table to control the rotational speed of the table during welding operations.

A means is connected to the top portion for engaging the journal bearing. The journal bearing support means securely supports the journal bearing about its axis of rotation when the rotary table rotates the leg.

An opening is formed in the top portion. The opening is positioned adjacent the means for engaging the journal bearing. The opening permits a welding process to direct a beam of energy to an intersection formed between the metal static portion of the belleville seal and the journal bearing to metallurgically bond the belleville seal to the leg when the rotary table rotates the leg while the welding process is in operation.

An advantage of the present invention over the prior art is the ability to provide a welding fixture to weld a belleville seal to a leg of a rotary cone rock bit through 360° of an interface formed between the inner metal ring of the belleville and the journal bearing of the rock bit. The welding fixture provides a means to radially mount the leg in the fixture, thus assuring continuity and good quality control during the 360° welding operation. Obviously, the same fixture may partially weld a belleville ring to the journal bearing of the leg.

The above noted objects and advantages of the present invention will be more fully understood upon a study of the description in conjunction with the detailed drawings.

BRIEF DESCRIPTION OF THE DRAWINGS

FIG. 3 is a view taken through 3—3 of FIG. 2, illustrating the rotary table and leg mounting fixtures attached thereto; and FIG. 4 is an alternative embodiment wherein a pneumatic method is illustrated in which the leg of the rock bit is secured to the rotatable collet mounted to the upper fixture support.

DESCRIPTION OF THE PREFERRED EMBODIMENTS AND BEST MODE FOR CARRYING OUT THE INVENTION

Figure 1:
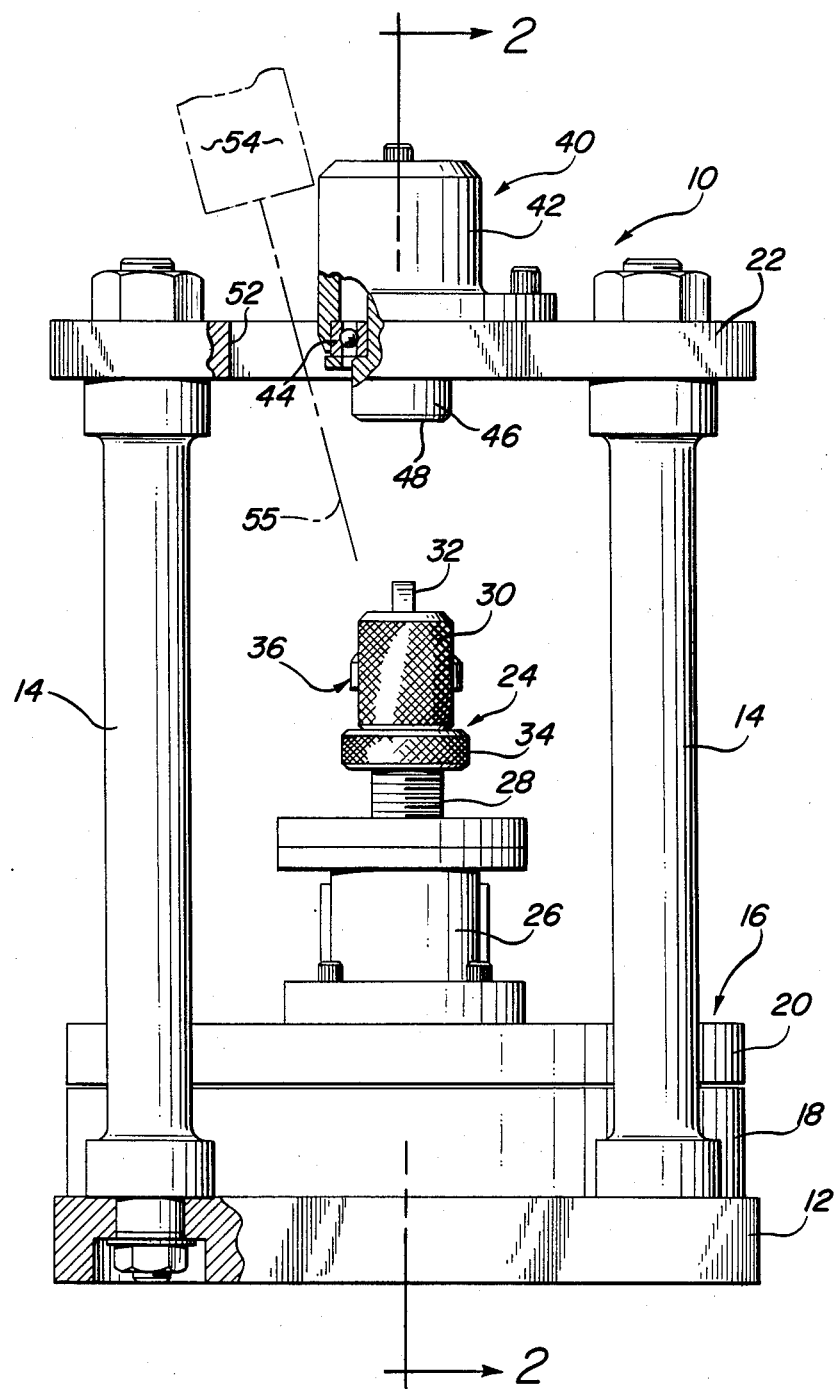
FIG. 1 is an end view of the welding fixture.
Figure 2:
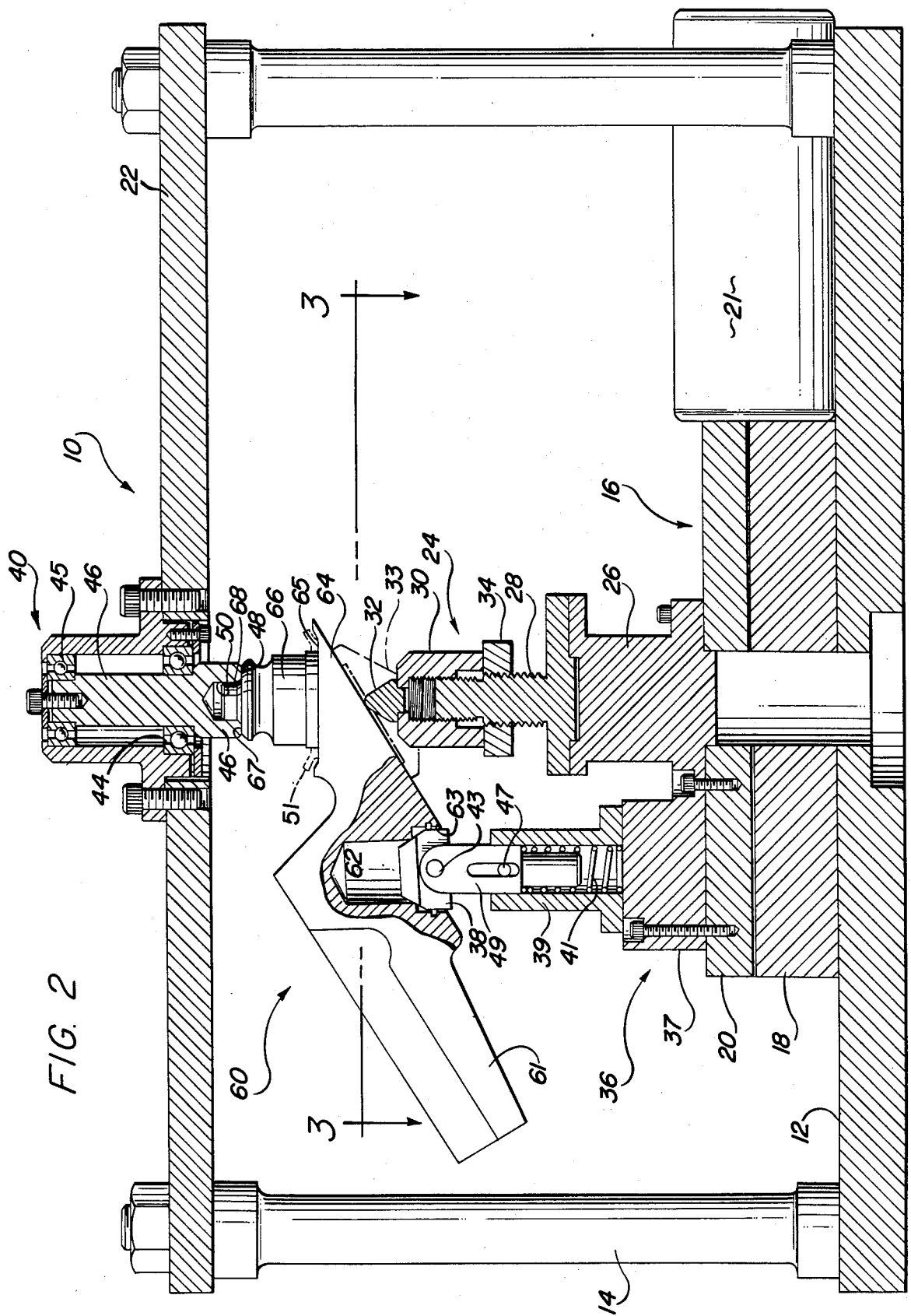
FIG. 2 is a view taken through 2—2 of FIG. 1, illustrating the welding fixture, partially in cross section, with a single leg of a rotary cone rock bit mounted within the fixture.

FIG. 1 depicts the welding fixture, generally designated as 10, and consists of a fixture base 12, support post 14 and upper plate 22. Secured to base 12 is a turntable, generally designated as 16. The base 18 of turntable 16 is secured to fixture base 12 and the rotary turntable 20 is rotatively secured to turntable base 18. A variable speed motor 21 is connected to rotary table 20 (FIGS. 2 and 3). The variable speed motor 21 is controlled by, for example, a rheostat type device to vary the rotary table speed during operation of the welding fixture (not shown).

Mounted to the center of the turntable 20 is a rock bit leg holding fixture, generally designated as 24. The fixture consists of a base portion 26, which supports a threaded shank 28 extending from the top of the support 26. The threaded shank 28 supports a threaded leg support collet 30 with a jam nut 34 between the base of collet 30 and the support 26. At the top of the collet 30 is a contact pin 32, the purpose of which will be forthcoming.

The upper fixture support 22 provides a base support plate for a leg journal bearing holding fixture, generally designated as 40. The bearing holding fixture consists of a housing 42 that is attached or bolted to plate 22. The housing rotatively contains a rotary collet designed to accept the spindle end of a journal bearing. The rotary collet 46 is contained by a pair of roller bearings 44 and 45 (FIG. 2). The rotary collet securely supports the journal bearing 66 (FIG. 2) about its axis of rotation when the rotary table 20 rotates the leg.

An opening 52, formed in plate 22 adjacent the housing 42, provides a means for a welding beam to be directed towards a workpiece (FIG. 2). Shown in phantom, for example, is a laser welding mechanism 54 that directs a laser beam 55 to a workpiece secured between the turntable and wave laser welding process is preferred. For example, a Spectra-Physics laser, Model No. 820, has been successfully utilized. The particular laser used is a 1500 watt industrial laser and is a $CO_2$ gas transport type. The laser is manufactured by Spectra-Physics at San Jose, Calif.

Other types of welders could be utilized with this welding fixture. For example, an electron beam welder could be used, as well as various types of laser systems, such as a pulsed laser or a continuous-wave welder.

Turning now to FIG. 2, a single 120° rotary rock bit leg segment is supported within the welding fixture 10. The rock bit leg segment, generally designated as 60, consists of a pin end 61, a lube reservoir chamber 62 formed in the body of the leg, and a shirttail portion 64. Extending from the shirttail portion of the leg is a journal bearing 66 that transitions into a pintle or spindle 68. The end of the large journal bearing terminates in a thrust face 67, the spindle 68 extending from the thrust face surface is, of course, concentric with the main journal bearing 66.

In operation, the leg is placed within the fixture with the spindle 68 inserted within bearing cavity 50 formed in collet 46. The base 48 of the rotary collet 46 is in contact with thrust face 67 of leg 60. The journal bearing thus is securely mounted within the rotary collet 46. The spindle 68 is securely held within the bearing surface 50 in the rotary collet 46 by leg holding fixture 24. The leg support collet 30 is screwed up threaded shank 28 until contact pin 32 engages shirttail portion 64. The centerline of the shank 28 is aligned with the centerline of collet 46 of the leg journal bearing holding fixture 40. Once the contact pin 32 engages the shirttail portion of the leg, the knurled lock nut 34 is threaded against the base of threaded leg support collet 30 to ensure that the leg maintains its relationship with the rotary fixture 40.

The leg turning fixture 36 then comes into operation in that the floating head 38 is engaged with mouth 63 of lube reservoir 62 formed in leg 60. The floating head 38 is engaged with sliding head support 49 by pin 43. The floating head support 49 is slidably engaged with a support base 39 which contains an actuation spring 41. The floating head support 49 is contained within housing 39 by a head restraining pin 47 engaged with the housing 39. The primary function of leg turning fixture 36, mounted to the rotary table, is to rotate the leg 60 within the fixture 10.

The welding fixture is used primarily to weld a metal portion of a circular seal (such as a belleville seal), positioned between the leg backface 65 and the journal bearing 66. A welding beam is directed to an interface between the seal and the leg 66 to continuously weld an interface joint formed between the seal and the leg through 360° by rotating the rotary table 20. A belleville seal 51 is shown in phantom, positioned between journal 66 and leg backface 65. The rotary table could be indexed to various positions by the variable speed motor 21 to spot weld the seal to the leg or it may be set up to continuously weld only a portion of the seal.

With reference now to FIG. 3, the rotary turntable 20 is illustrated with the leg holding fixture 24 and the leg turning fixture 36 mounted thereon. With regard to the leg holding fixture, the base 26, the knurled lock nut 34, and the threaded collet 30, supported by threaded shank 28, is shown. The leg turning fixture 36 may be radially adjusted through slotted openings on the base 37 to position the floating head 38 within certain limits to properly engage the lube reservoir in leg 60 (FIG. 2).

With reference now to FIG. 4, an alternative embodiment for the leg holding fixture 24 is shown. The leg holding fixture, generally designated as 70, consists of a base 81 that supports an air cylinder assembly 78. The base 81 is secured to rotary table 20. Concentric with the rotary table is a rotating pneumatic union 72 that is mounted to a base support fixture 73, which in turn is secured to base plate 12. The pneumatic rotary union has a supply of air directed to opening 74 (not shown) to direct air through the cylinder through rotary union 76. The union 76 has a conduit formed therethrough that communicates with chamber 82 formed by support base 81. A pipe 84 communicates between chamber 82 and the pneumatic cylinder assembly 78. The pneumatic cylinder assembly comprises an internal piston 79. The end of the piston supports a rock bit leg contact pin 80. During operation, a source of air supplied to the pneumatic rotary union 72 is directed into chamber 82 and, from there, through pipe 84 to the air cylinder 78. The air pressure drives the piston 79 out of the air cylinder 78 to engage contact pin 80 with shirttail 64 of leg 60 in much the same manner as the threaded mechanism 24 of FIGS. 1, 2 and 3.

This embodiment would lend itself to more efficient production in that the pneumatic leg holding fixture may be easily and quickly actuated to perform the welding function for which the welding fixture 10 was designed.

While the welding fixture was primarily designed to weld belleville type seals (51, FIG. 2) to rock bit leg segments, the fixture may be utilized to perform continuous 360° welding operations for any number of applications without departing from the scope of this invention.

It will of course be realized that various modifications can be made in the design and operation of the present invention without departing from the spirit thereof. Thus, while the principal preferred construction and mode of operation of the invention have been explained in what is now considered to represent its best embodiments, which have been illustrated and described, it should be understood that within the scope of the appended claims, the invention may be practiced otherwise than as specifically illustrated and described.

What is claimed is:

1. A welding fixture to weld a metal static portion of a belleville seal to a journal bearing, said journal bearing extending from a leg of a sealed bearing rotary cone rock bit, said welding fixture comprising:

a frame, said frame consisting of a base portion and a parallel spaced-apart top portion, said top portion being supported by support means interposed between said base portion and said top portion, said means to support said top portion is at least four posts connected between said base portion and said top portion, a rotary table connected to said base portion, said rotary table having means to support said leg of said rock bit, said means to support said leg of said rock bit is a centrally positioned pintle mechanism mounted to said rotary table, said mechanism having engagement means at a first end that engage a shirttail portion formed by said leg of said rock bit, said first end being substantially aligned with an axis of said journal bearing of said rock bit, said engagement means within said pintle mechanism is a threadable pin that is threadably rotated outwardly to engage said shirttail portion of said rock bit leg, said rotary table having means to rotate said leg of said rock bit, said means to rotate said leg is a leg rotation mechanism adapted to engage a lube reservoir chamber formed in a leg backface of said rock bit leg, a head portion of said leg rotation mechanism has engagement means within said leg rotation mechanism to engage said head within an opening to said reservoir chamber formed by said leg to rotate said rock bit leg during said welding operations, said engagement means within said leg rotation mechanism to engage said head within said reservoir opening is a coil spring, means for rotating said rotary table, said means for rotating said rotary table is an electric motor, said electric motor is a variable speed electric motor having means associated therewith to vary the rotational speed of said rotary table during welding operations, means connected to said top portion for engaging said journal bearing, said means securely supports said journal bearing about its axis of rotation when said rotary table rotates said leg, said means is a collet adapted to be engaged with an axially aligned spindle bearing formed by and extending from an end of said journal bearing, said collet further engages a thrust face formed by said journal bearing, said thrust face is transverse to an axis of said journal bearing, said collet is rotatively mounted within a collet retention means mounted to said top portion, said collet assures secure rotational alignment of said journal bearing of said rock bit leg during said welding operation, and an opening formed in said top portion, said opening is positioned adjacent said means for engaging said journal bearing, said opening permits a welding process to direct a beam of energy to an intersection formed between said metal static portion of said belleville seal and said seal and said journal to metallurgically bond said seal to said leg when said rotary table rotates said leg while said welding process is in operation.

2. A welding fixture to weld a metal static portion of a belleville seal to a journal bearing, said journal bearing extending from a leg of a sealed bearing rotary cone rock bit, said welding fixture comprising:

a frame, said frame consisting of a base portion and a parallel spaced-apart top portion, said top portion being supported by post support means interposed between said base portion and said top portion.

a rotary table connected to said base portion, said rotary table having means to support said leg of said rock bit, said means to support said leg of said rock bit is a centrally positioned pintle mechanism mounted to said rotary table, said mechanism having engagement means at a first end that engages a shirttail portion formed by said leg of said rock bit, said engagement means at said first end within said pintle mechanism is a threadable pin that is threadably rotated outwardly to engage said shirttail portion of said rock bit leg, said rotary table having means to rotate said leg of said rock bit, means for rotating said rotary table, means connected to said top portion of said frame for engaging said journal bearing, said means securely supports said journal bearing about its axis of rotation when said rotary table rotates said leg, and an opening formed in said top portion, said opening is positioned adjacent said means for engaging said journal bearing, said opening permits welding process to direct a beam of energy to an intersection formed between said metal static portion of said belleville seal and said journal bearing to metallurgically bond said seal to said leg when said rotary table rotates said leg while said welding process is in operation.

3. The invention as set forth in 2 wherein said engagement means at said first end within said pintle mechanism is a pneumatic cylinder, a pin end of said cylinder engages said shirttail portion of said rock bit leg.

4. The invention as set forth in claim 2 wherein said means to rotate said leg mounted to said rotary table is a leg rotation mechanism adapted to engage a lube reservoir chamber formed in a leg backface of said rock bit leg, a head portion of said leg rotation mechanism has engagement means within said leg rotation mechanism to engage said head within an opening to said reservoir chamber formed by said leg to rotate said rock bit leg during said welding operation.

5. The invention as set forth in claim 4 wherein said engagement means within said leg rotation mechanism to engage said head within said reservoir opening is a coil spring.

6. The invention as set forth in claim 2 wherein said means connected to said top portion for engaging said journal bearing is a collet adapted to be engaged with an axially aligned spindle extending from an end of said journal bearing and a thrust face transverse to an axis of said journal bearing, said collet is rotatively mounted within a collet retention means mounted to said top portion, said collet assures secure rotational alignment of said journal bearing of said rock bit leg during said welding operation.

* * * * *